(No Model.)
F. SCHOMBEL.
COFFEE AND TEA BOX.
No. 317,678. Patented May 12, 1885.
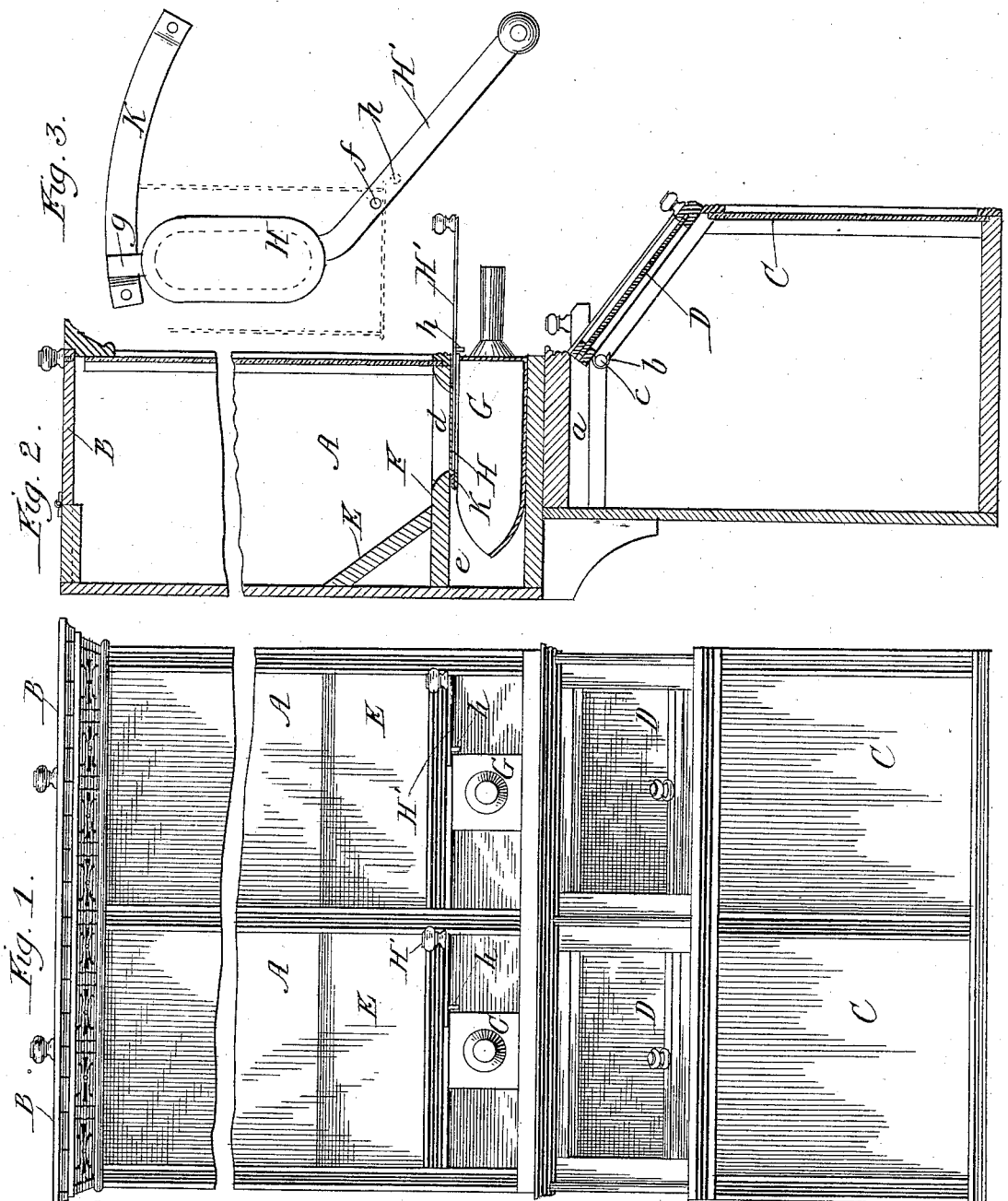
Witnesses:
Frank J. Blanchard
Louis Nolting
Inventor
Fritz Schombel
By Wm. H. Lotz & Co.
Attorneys.

United States Patent Office.

FRITZ SCHOMBEL, OF CHICAGO, ILLINOIS.

COFFEE AND TEA BOX.

SPECIFICATION forming part of Letters Patent No. 317,678, dated May 12, 1885.

Application filed February 17, 1885. (No model.)

*To all whom it may concern:*

Be it known that I, FRITZ SCHOMBEL, a subject of the Emperor of Germany, residing at Chicago, in the county of Cook and State of Illinois, have invented certain new and useful Improvements in Coffee and Tea Boxes, of which the following is a specification, reference being had therein to the accompanying drawings.

My invention relates to an improved measure for coffees, teas, sugars, &c.

The object of the invention is to combine with the receptacles for such articles a valve, by the opening of which the article is allowed to escape to a suitable measure; and to the accomplishment of that end the invention consists of certain novel devices and combination of devices, as will be described and claimed.

Reference will be made to the accompanying drawings, in which Figure 1 is a front elevation of a case with the invention applied; Fig. 2, a sectional view through the same, and Fig. 3 a view in detail of the valve used.

Like letters refer to like parts in each view.

A represents a receptacle for coffee, tea, or other like articles, preferably provided with glass fronts, and upon its top with suitable hinged covers, B, there being one cover for each compartment into which the receptacle is divided. The receptacle shown is divided into two compartments, and is represented as supported upon a base, C, also so subdivided, said base being provided with sliding doors D, each of which moves in a groove, $a$, and is provided with a hook, $b$, which surrounds a rod, $c$, and limits the movement of the doors.

In each compartment of receptacle A there is provided an inclined board, E, extending from the back of the receptacle to the floor F thereof. Each floor F is provided with an opening, $d$, and between such floors and the base of the receptacle there is a space, $e$, sufficiently large to accommodate a measure, G, which is inserted through a front opening, and rests below the opening $d$, so as to receive any coffee passing therethrough. Measures G may be constructed of any desired dimensions—as, for instance, one may be arranged to receive exactly one pound of the lightest coffee and one a corresponding amount of the heaviest, or one a pound and the other a half pound, and so on indefinitely. Openings $d$ are closed, when it is not desired to admit coffee to the measures, by a valve, H. (Shown in detail in Fig. 3.) This valve consists of a plate and a handle, H', secured thereto preferably at an angle, as shown. These handles are suitably pivoted at $f$, so that by operating them the openings $d$ will be closed by the valves or left open by said valves being withdrawn therefrom.

To the rear end of valve H there is secured or formed a projection, $g$, which extends rearwardly and is adapted to move in a guide, K, secured to the under face of floor F, this arrangement serving to limit the movement of the valve.

Upon the under face of each handle H' there is formed a pin or stud, $h$, so situated that when the handle is revolved to remove the valve from under the opening $d$ it will occupy a position directly in front of the measure, and thus prevent the removal of said measure until the valve is closed.

What I claim is—

1. The combination, with receptacle, A, bottom F provided with opening $d$, and measure G, of valve H provided with projections $g$, and guide K, as set forth.

2. The combination, with receptacle A, bottom F provided with opening $d$, and measure G, of valve H, handle H', and pin or stud $h$, as set forth.

In testimony whereof I affix my signature in presence of two witnesses.

FRITZ SCHOMBEL.

Witnesses:
ALBERT FLORUS,
M. J. CLAGETT.